US011314619B2

(12) United States Patent
DeMeuse et al.

(10) Patent No.: US 11,314,619 B2
(45) Date of Patent: *Apr. 26, 2022

(54) CONTEXTUALIZED NOTIFICATIONS FOR VERBOSE APPLICATION ERRORS

(71) Applicant: Palantir Technologies Inc., Palo Alto, CA (US)

(72) Inventors: Lauren DeMeuse, Emerald Hills, CA (US); Grant Wu, Seattle, WA (US); Garren Riechel, Menlo Park, CA (US); Ian Mair, New York, NY (US); Michael Nazario, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/997,215

(22) Filed: Aug. 19, 2020

(65) Prior Publication Data

US 2020/0379873 A1 Dec. 3, 2020

Related U.S. Application Data

(63) Continuation of application No. 15/934,604, filed on Mar. 23, 2018, now Pat. No. 10,783,053.

(60) Provisional application No. 62/520,879, filed on Jun. 16, 2017.

(51) Int. Cl.
*G06F 11/00* (2006.01)
*G06F 11/34* (2006.01)
*G06F 11/07* (2006.01)
*H04W 4/14* (2009.01)

(52) U.S. Cl.
CPC ........ *G06F 11/3476* (2013.01); *G06F 11/079* (2013.01); *G06F 11/0772* (2013.01); *G06F 11/0784* (2013.01); *H04W 4/14* (2013.01)

(58) Field of Classification Search
CPC ............. G06F 11/0772; G06F 11/0784; G06F 11/079; G06F 11/3476; H04W 4/14
USPC ........................................................... 714/57
See application file for complete search history.

(56) References Cited

U.S. PATENT DOCUMENTS

| 9,009,539 | B1 | 4/2015 | Kompotis et al. |
| 9,977,707 | B1 | 5/2018 | Nagabushanam |
| 10,783,053 | B1 | 9/2020 | DeMeuse et al. |
| 2008/0033964 | A1 | 2/2008 | Richards et al. |
| 2010/0106705 | A1 | 4/2010 | Rush et al. |
| 2010/0122345 | A1 | 5/2010 | Wu et al. |
| 2011/0153616 | A1 | 6/2011 | Torres |
| 2012/0036397 | A1 | 2/2012 | Balani et al. |
| 2013/0166967 | A1 | 6/2013 | Jerde et al. |

(Continued)

OTHER PUBLICATIONS

"U.S. Appl. No. 15/376,355, Non Final Office Action dated Aug. 16, 2018", 16 pgs.

(Continued)

*Primary Examiner* — Chae M Ko
(74) *Attorney, Agent, or Firm* — Schwegman Lundberg & Woessner, P.A.

(57) ABSTRACT

Errors encountered by executing applications can be recorded in one or more logs. A search engine can be configured to retrieve error data from the one or more logs using pre-specified rules. A portion of the error data can be included in a small portable message (e.g., SMS text message) and sent to the developers or administrators of the applications. An administrative console can generate different visualizations based upon what errors the search engine retrieved.

20 Claims, 14 Drawing Sheets

(56) References Cited

U.S. PATENT DOCUMENTS

| | | |
|---|---|---|
| 2013/0227352 A1* | 8/2013 | Kumarasamy ...... G06F 11/1461 |
| | | 714/47.1 |
| 2014/0237304 A1 | 8/2014 | Lai et al. |
| 2015/0347264 A1 | 12/2015 | Mohammed et al. |
| 2016/0042275 A1 | 2/2016 | Dettman et al. |
| 2016/0328281 A1 | 11/2016 | Lee et al. |
| 2017/0126476 A1 | 5/2017 | Curtin et al. |
| 2017/0315015 A1* | 11/2017 | Weidner ................. G01L 9/007 |
| 2017/0345015 A1* | 11/2017 | Ranganna ........... H04L 41/5035 |
| 2018/0060225 A1 | 3/2018 | Tao |
| 2018/0196753 A1 | 7/2018 | Bitincka et al. |
| 2019/0026174 A1 | 1/2019 | Basavarajappa et al. |
| 2019/0050747 A1 | 2/2019 | Nakamura et al. |
| 2019/0057015 A1 | 2/2019 | Hassan |
| 2019/0171622 A1 | 6/2019 | Zong et al. |
| 2019/0260789 A1 | 8/2019 | Hagi et al. |

OTHER PUBLICATIONS

"U.S. Appl. No. 15/934,604, First Action Interview—Office Action Summary dated Feb. 4, 2020".

"U.S. Appl. No. 15/934,604, First Action Interview—Pre-Interview Communication dated Nov. 15, 2019", 3 pgs.

"U.S. Appl. No. 15/934,604, Notice of Allowance dated May 20, 2020", 9 pgs.

"U.S. Appl. No. 15/934,604, Response filed May 4, 2020 to First Action Interview—Office Action Summary dated Feb. 4, 2020", 12 pgs.

U.S. Appl. No. 15/934,604, filed Mar. 23, 2018, Contextualized Notifications for Verbose Application Errors, U.S. Pat. No. 10,783,053.

* cited by examiner

FIG. 9

CONTEXTUALIZED NOTIFICATIONS FOR VERBOSE APPLICATION ERRORS

PRIORITY APPLICATION

This application is a continuation of U.S. patent application Ser. No. 15/934,604, filed Mar. 23, 2018, which claims priority to U.S. Provisional Application Ser. No. 62/520,879, filed Jun. 16, 2017, the disclosures of which are incorporated herein in their entireties by reference.

TECHNICAL FIELD

Embodiments of the present disclosure relate generally to error processing and, more particularly, but not by way of limitation, to contextualized notifications for verbose application errors.

BACKGROUND

When an application encounters an error an entry may be created in a log. The log and error data may be accessible by users (e.g., administrators and developers) through terminals (e.g., command line terminal). However, if the users do not have access to a terminal then they cannot access the error data and fix the problem in the application.

BRIEF DESCRIPTION OF THE DRAWINGS

Various ones of the appended drawings merely illustrate example embodiments of the present disclosure and should not be considered as limiting its scope.

FIGS. 8-12 show examples of user interfaces that can be included in a dashboard or administrative console.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Errors encountered by executing applications (e.g., cloud applications, local applications installed on an operating system of a computer) can be recorded in one or more logs. The logs can include network status logs and execution logs. The network status logs can include all the request information (e.g., Hypertext Transfer Protocol (HTTP) requests) issued from the applications. The execution log comprises programmatic code of the server side logic running at the time of the error (e.g., a stack trace). A search engine (e.g., Apache Lucene) can be configured to retrieve error data from the one or more logs using pre-specified rules. The rules can instruct that a given type of error should be searched for (e.g., HTTP 5xx class of errors) using keywords or field metadata. A portion of the error data can be included in a small portable message (e.g., Small Message Service (SMS) text message) and sent to the developers or administrators of the applications. The message can include a network link (e.g., hyper link) to a web-browser based administrative console. The administrative console can generate different visualizations based upon what errors the search engine retrieved. In some example embodiments, the different visualizations are displayed in a dashboard layout (e.g., multiple windows showing different types of error visualizations).

Figure 1:
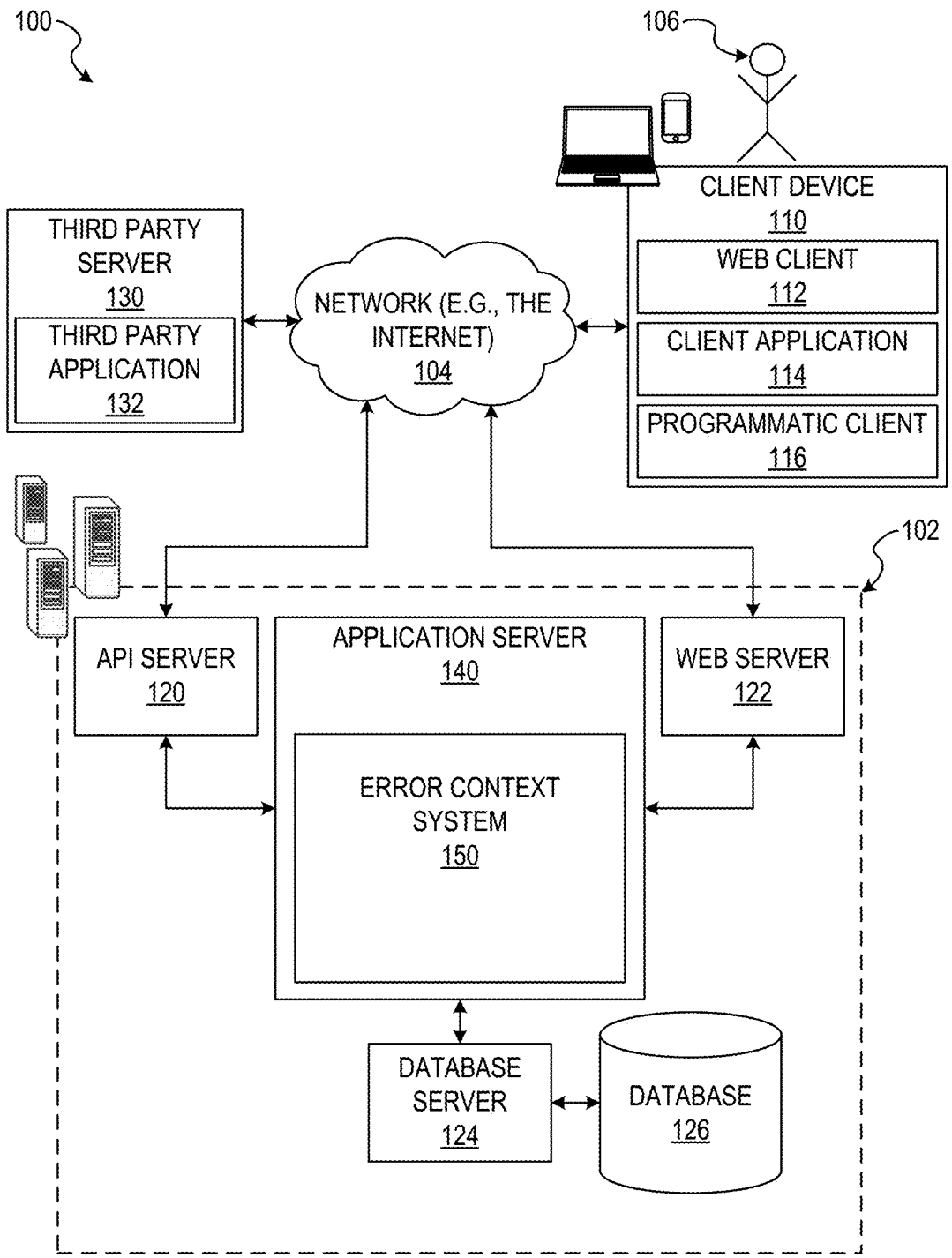
FIG. 1 is a block diagram illustrating an error context system integrated into a networked system, according to some example embodiments.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), applications 114, and a programmatic client 116 executing on the client device 110. The client device 110 includes the web client 112, the client application 114, and the programmatic client 116 alone, together, or in any suitable combination. Although FIG. 1 shows one client device 110, in other implementations, the network architecture 100 comprises multiple client devices 110.

In various implementations, the client device 110 comprises a computing device that includes at least a display and communication capabilities that provides access to the networked system 102 via the network 104. The client device 110 comprises, but is not limited to, a remote device, work station, computer, general purpose computer, Internet appliance, hand-held device, wireless device, portable device, wearable computer, cellular or mobile phone, personal digital assistant (PDA), smart phone, tablet, ultrabook, netbook, laptop, desktop, multi-processor system, microprocessor-based or programmable consumer electronic, game consoles, set-top box, network personal computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications 114 (also referred to as "apps") such as, but not limited to, web browsers, book reader apps (operable to read e-books), media apps (operable to present various media forms including audio and video), fitness apps, biometric monitoring apps, messaging apps, electronic mail (email) apps. In some implementations, the client applications 114 include various components operable to present information to the user 106 and communicate with networked system 102.

The web client 112 accesses the various systems of the networked system 102 via the web interface supported by a web server 122. Similarly, the programmatic client 116 and client application 114 accesses the various services and functions provided by the networked system 102 via the programmatic interface provided by an application program interface (API) server 120.

Users (e.g., the user 106) comprise a person, a machine, or other means of interacting with the client device 110. In some example embodiments, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

The API server 120 and the web server 122 are coupled to, and provide programmatic and web interfaces respectively to, one or more application server 140. The application server 140 can host a error context system 150, which can comprise one or more modules or applications 114 and each of which can be embodied as hardware, software, firmware, or any combination thereof. The application server 140 is, in turn, shown to be coupled to a database server 124 that facilitates access to one or more information storage repositories, such as database 126. In an example embodiment, the database 126 comprises one or more storage devices that store information to be accessed by the error context system 150 or client device 110. Additionally, a third party application 132, executing on third party server 130, is shown as having programmatic access to the networked system 102 via the programmatic interface provided by the API server 120. For example, the third party application 132, utilizing information retrieved from the networked system 102, supports one or more features or functions on a website hosted by the third party.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server 140 (e.g., the error context system 150) can also be implemented as standalone software programs, which do not necessarily have networking capabilities.

Figure 2:
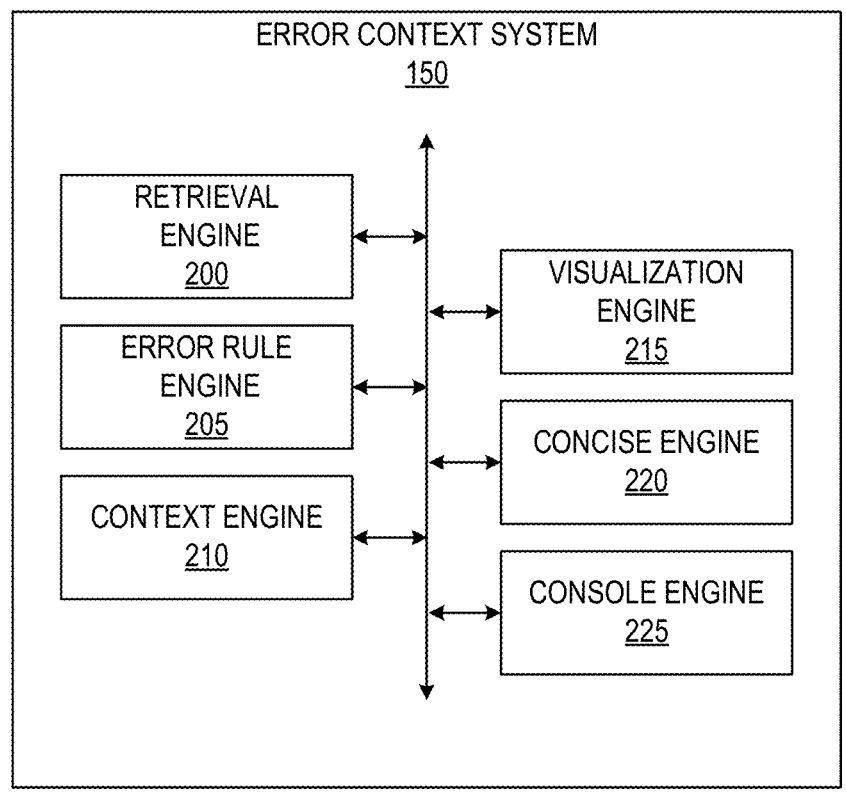
FIG. 2 is a block diagram showing example functional components provided within the error context system of FIG. 1, according to some example embodiments.

FIG. 2 illustrates a block diagram showing components provided within the error context system 150, according to some embodiments. As illustrated in FIG. 2, the error context system 150 comprises a retrieval engine 200, an error rule engine 205, a context engine 210, a visualization engine 215, a concise engine 220, and a console engine 225. The components themselves are communicatively coupled (e.g., via appropriate interfaces) to each other and to various data sources, so as to allow information to be passed between the applications 114 or so as to allow the applications 114 to share and access common data. Furthermore, the components access the database 126 via the database server 124.

General descriptions of the engine configurations are as follows, according to some example embodiments. The retrieval engine 200 is configured to retrieve error logs generated from executing applications 114. The retrieval engine 200 is further configured to redact customer information, such as customer identifiers (ID), user agent identifiers, or usernames, in the logs to ensure user privacy.

The error rule engine 205 is configured to receive error rules and search through the retrieved logs to identify errors defined by the rules. The context engine 210 analyzes the errors to generate further context, such as whether the errors are of the same type, whether the errors are occurring on different applications 114 or on the same server, or whether the errors exceed a normal frequency of errors. The visualization engine 215 is configured to generate visualizations such as tables and graphs that users 106 can view after they receive error notifications, e.g., text message notifications of errors occurring in real-time. The concise engine 220 is configured to generate messages (e.g., SMS messages) to be transmitted to one or more users 106 (e.g., developers or administrators that manage the running applications 114). The console engine 225 is configured to manage a dashboard that shows full error data (e.g., visualizations and verbose error data that is not included in the messages sent to the users 106).

Figure 3:
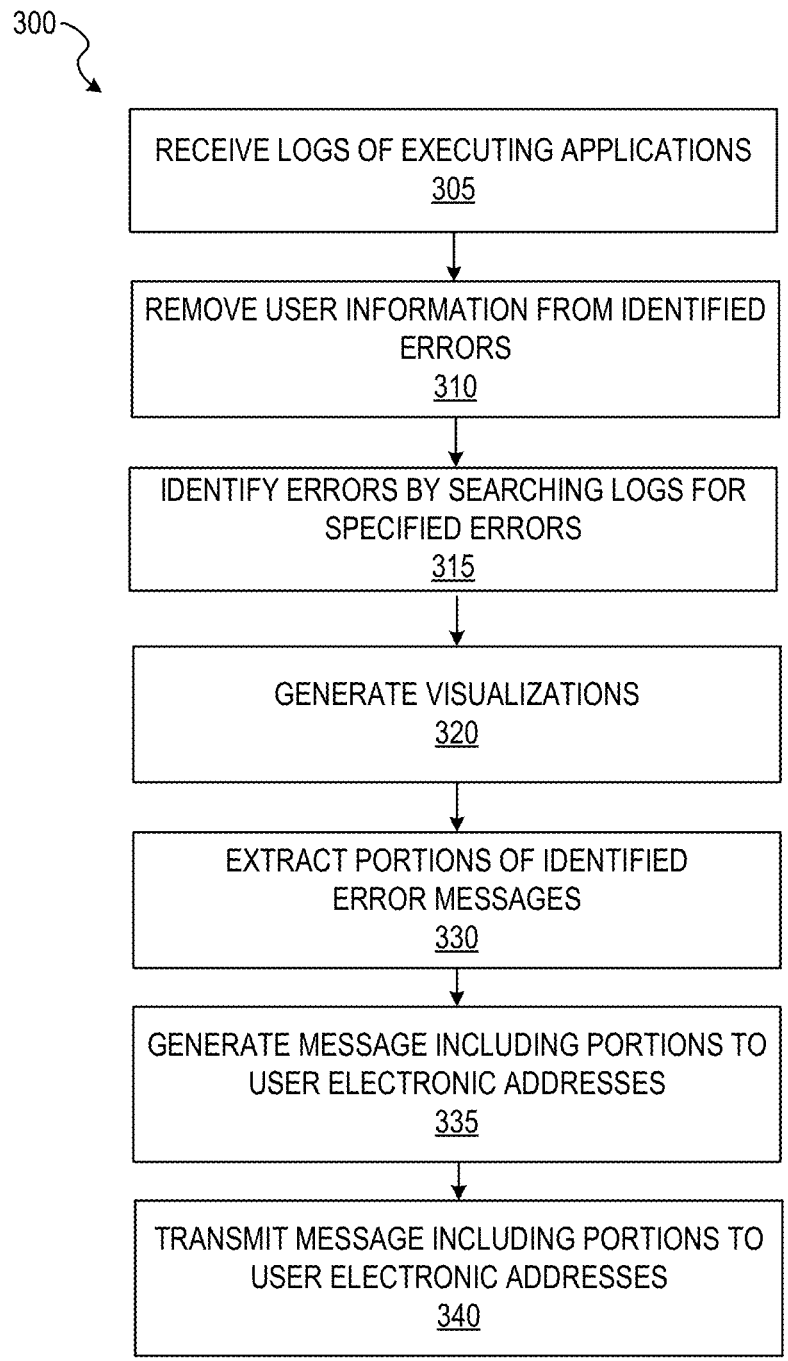
FIG. 3 shows a flow diagram of a method for generating concise error messages, according to some example embodiments.

FIG. 3 shows a flow diagram of a method 300 for generating concise error messages, according to some example embodiments. At operation 305, the retrieval engine 200 receives logs of applications 114 executing on one or more network servers. In some embodiments, multiple types of logs are generated from the executing applications 114, including a network status log and an execution log. The network status log includes all of the network status codes generated from the executing applications 114. For example, the network status codes can be HTTP status codes such as a 2xx class of codes (success codes, such as 200 OK, or 202 Accepted), or 4xx class of codes (client error codes such as 404 Not Found, or 408 Not Acceptable). The execution logs include programmatic code running on the backend by sever applications. In some example embodiments, the execution logs are stack traces of methods called by a network application.

At operation 310, the retrieval engine 200 removes customer identifying information from the logs. The customer information can include any information that uniquely identifies a user 1016 (e.g., full name, social security number, username, user identifier) within the network or in the real world (e.g., social security number, full name). According to some example embodiments, the customer identifying information is redacted to remove the chance that subsequent notification processors send out notifications with customer info. In this way, the errors can more readily be distributed (e.g., via SMS) in a way that maintains user privacy.

At operation 315, the error rule engine 205 identifies errors in the logs by searching through the logs using pre-configured rules. In some example embodiments, the received logs are initially indexed using an inverted index-based search engine (e.g., Apache Lucene). An example rule can then create a search for all errors of a given class, e.g., all 4xx class errors, all 5xx class errors. In some implementations an error causes both an error in the network status log and the execution log. A rule may specify that for each error found in the network status log, the execution code of the methods executing when the error occurred (e.g., a stack trace) should be retrieved from the execution log.

At operation 320, the visualization engine 215 generates visualizations that provide context for the errors found. For example, the visualizations may include a table that displays verbose info that is poorly suited for display in text messages (e.g., product info, instance info, time data, and stack trace data) due to SMS protocol limitations (e.g., character limitations per message). Additional examples of visualizations include code comparisons and graphs, as discussed in further detail below.

At operation 330, the concise engine 220 extracts data from the error messages. The extracted data is non-verbose data such as error type and application name. At operation 335, the concise engine 220 generates a message from the extracted data. The message may be generated using a message template. Example messages generated from different templates are discussed further below with reference to FIGS. 7A and 7B.

At operation 340, the concise engine 220 transmits the extracted data in a message to the electronic message addresses of one or more users 106. The electronic message addresses can be text message addresses (e.g., a phone number) or email addresses. The users 106 are developers or admins of the executing applications 114. In some example embodiments, the concise engine 220 stores a table specifying which developer/admin is associated with which applications 114. In this way, when a given application 114 issues errors, a text message is sent to a given team of developers wherever they may be in real-time (e.g., when the error occurs, soon after the error occurs, within five minutes of the error occurring).

Figure 4:
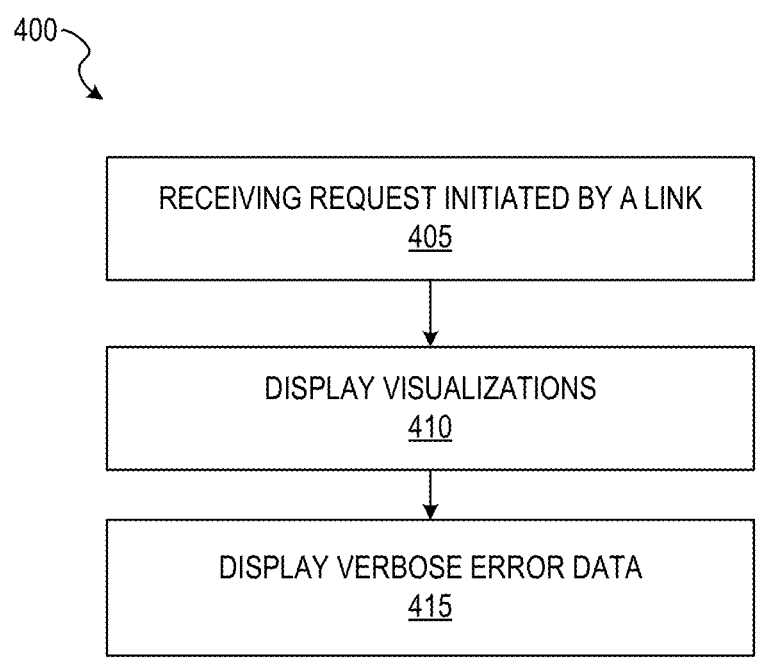
FIG. 4 shows a flow diagram of a method for managing requests for further error information, according to some example embodiments.

FIG. 4 shows a flow diagram of a method 400 for managing requests for further error information, according to some example embodiments. The messages sent to the one or more users 106 at operation 335 comprise a network link to a website. The users 106 can receive the error notification, and select the link to be directed to the network site to view further error information. The operations of method 400 are server side operations performed by application server 140, according to some example embodiments.

At operation 405, the console engine 225 receives a request generated from a link included in one of the transmitted error messages. In some example embodiments, the console engine 225 prompts the user 106 that requested the link to login using his/her user name and password. Once the user 106 logs in, a session is created for that user 106 in which a dashboard can be presented to the user 106.

At operation 410, the console engine 225 displays the visualizations generated in an administrative user interface (e.g., dashboard). The visualizations provide the user 106 with context about where the error is occurring (e.g., across which applications 114, which versions, or which servers).

At operation 415, the console engine 225 displays verbose error data in the administrative user interface. The verbose error data can include data such as program information or methods called when a given error occurred.

Figure 5:
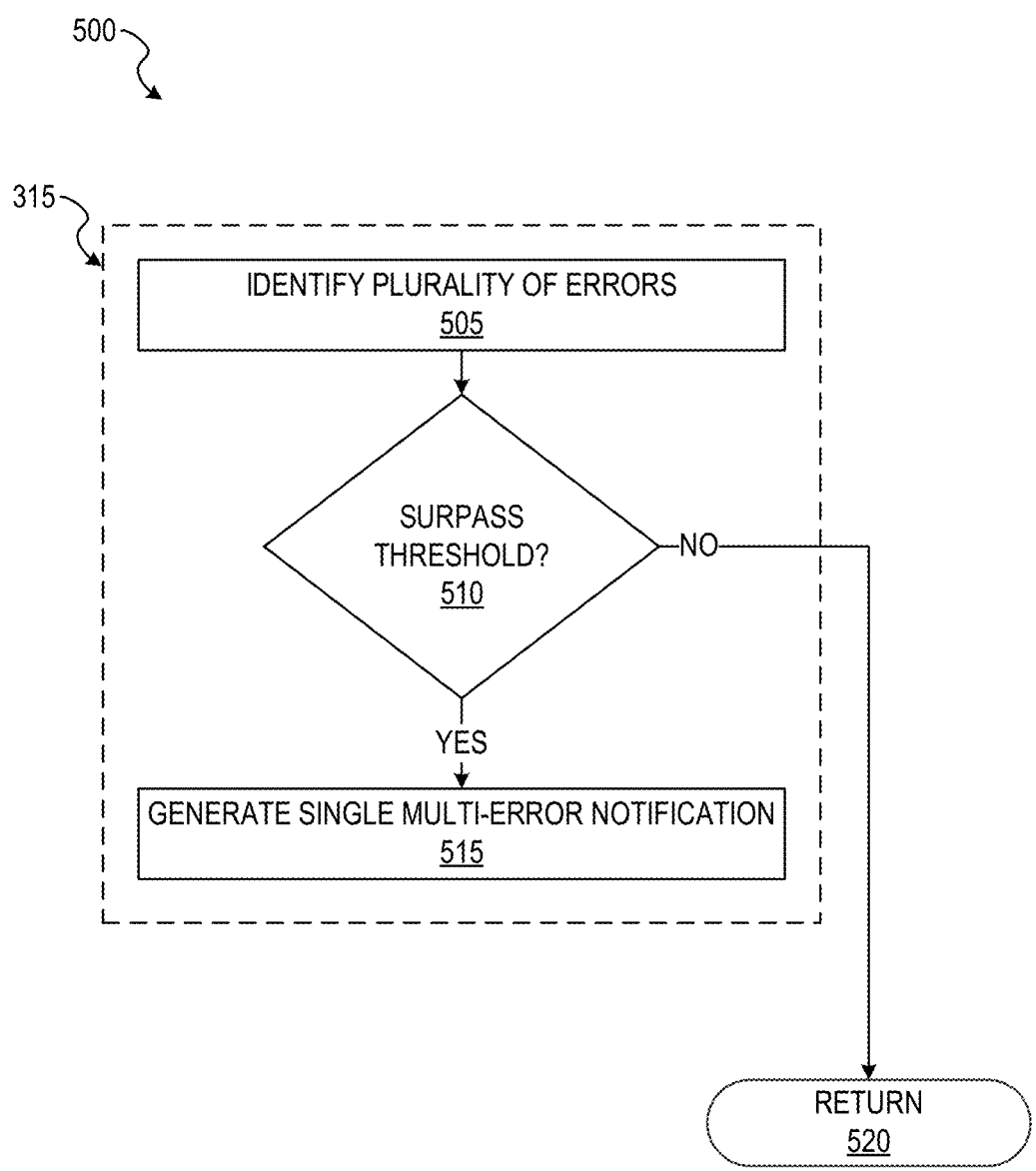
FIG. 5 shows a flow diagram of a method for suppressing errors, according to some example embodiments.

FIG. 5 shows a flow diagram of a method 500 for suppressing errors, according to some example embodiments. As illustrated, the operations of method 500 may be performed as a sub-routine of operation 315 in FIG. 3, according to some example embodiments. In some instances, the applications 114 may generate a great number of errors in a short amount of time. For example, if a server goes down (e.g., improperly terminates), multiple HTTP errors may be generated (e.g., 5xx) errors. Notifying the one or more users 106 of every error via text message may inundate the users 106 with notifications. To prevent this, notifications may be batched so that redundant errors are suppressed. To this end, at operation 505, the context engine 210 identifies the plurality of errors found by the error rule engine 205 in the logs. At operation 510, the context engine 210 determines whether any errors of the same type surpass a pre-specified threshold. For example, a pre-specified threshold may specify that if a 5xx class error happens more than five times within a period of time (e.g., one minute), the error should be batched.

Accordingly, at operation 510, if errors of the same type surpass the threshold, then a single multi-error notification is generated at 515 to suppress extraneous notifications. The multi-error notification alerts that user 106 that "multiple" 5xx errors have occurred, or my specify the number of errors numerically. In contrast, if errors of the same type do not surpass the threshold, then the subroutine exits at operation 520 without batching of errors occurring. The context engine 210 can be configured to use custom error classes, and periods of time (e.g., 5 errors of any type within the past 30 seconds, 46 5xx class errors within the past hour). Further, the context engine 210 batches errors across application types. For example, the context engine 210 may identify a first error, e.g., a 403 error, then determine whether 403 errors have occurred on other applications 114 within 15 seconds of the first application 114's 403 error. If a pre-specified amount of 403 errors occur on other applications 114 within 15 seconds, the single notification can be generated at operation 515, according to some example embodiments.

Figure 6:
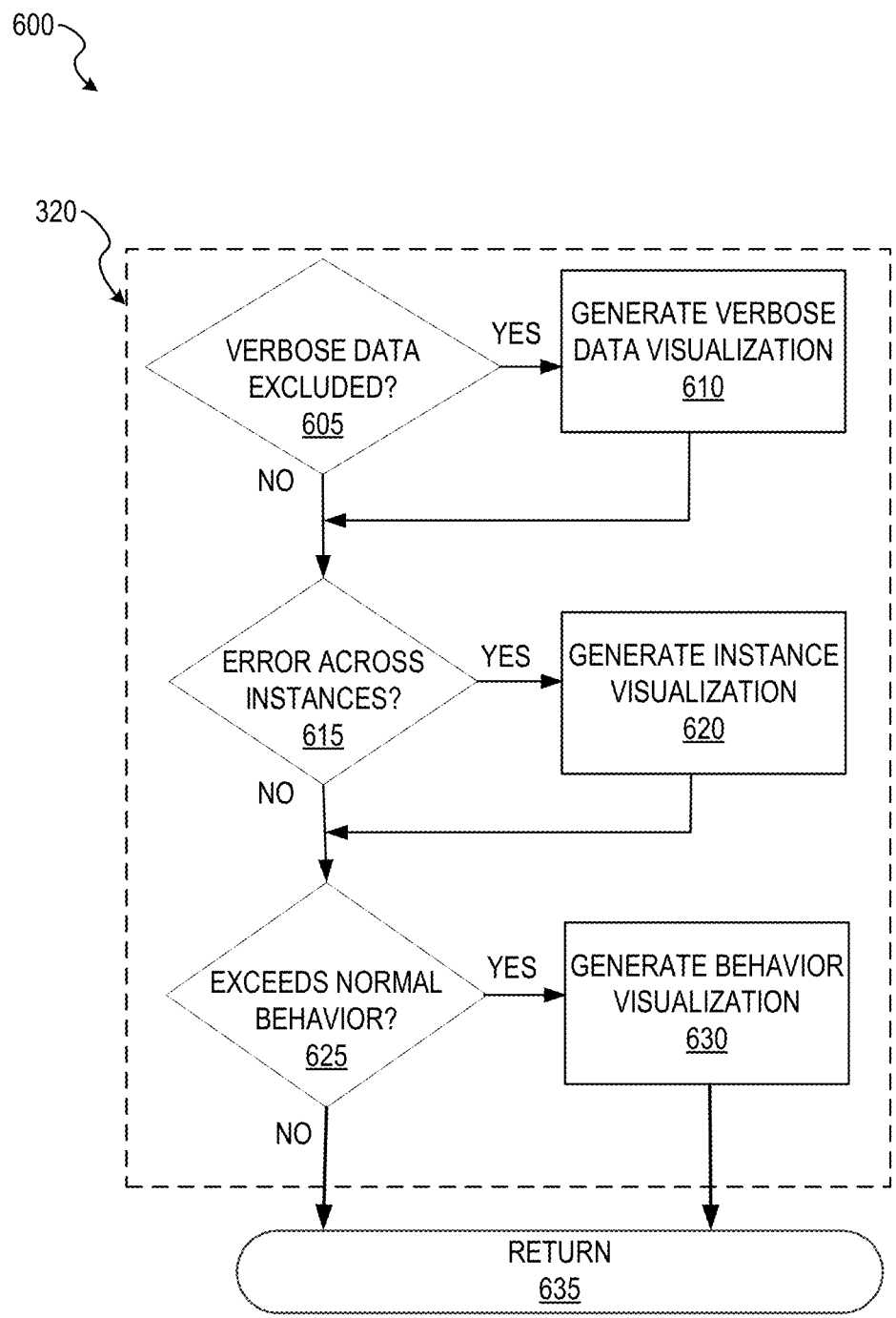
FIG. 6 shows a flow diagram of generating context information for errors, according to some example embodiments.

FIG. 6 shows a flow diagram of a method 600 of generating context information for errors, according to some example embodiments. As illustrated, the operations of method 600 may be performed as a sub-routine of operation 320 in FIG. 3, according to some example embodiments. At operation 605, the context engine 210 determines whether verbose error data was excluded from the messages sent to the users 106. If an error causes an entry in the network status log (e.g., 5xx error) and the execution log, the network status information may be extracted from the log and send to the user 106 via SMS or email. The verbose data (e.g., data from the execution log) is thus excluded. Accordingly, at operation 610 a visualization displaying the verbose data is generated. Returning to operation 605, if verbose errors data is not excluded, then the method continues to operation 615.

At operation 615, the context engine 210 determines whether the errors occurred across different instances or within a single application 114. If the errors occurred across different servers or within a single application 114, then at operation 620 the visualization engine 215 generates visualizations showing where the errors occurred. For example, if an error is part of the platform upon which applications 114 are running (e.g., Docker, an operating system level virtualization platform), then multiple applications 114 may issue errors. Accordingly, at operation 620, the visualization engine 215 may generate a visualization, such as a graph, that displays the error as occurring across multiple applications 114. In some example embodiments, an instance may refer to a server having an IP address that runs one or more applications 114 addressable through the IP address. Accordingly, for example, the context engine 210 may, at operation 615, determine that two applications 114 of the same type but different versions are issuing errors. Accordingly, at operation 620, the visualization engine 215 generates a visualization, such as a graph, that displays the error as occurring across the multiple versions of the same application 114. Returning to operation 615, if errors have not occurred across instances, then the method 600 continues to operation 625.

At operation 625, the context engine 210 determines whether the errors exceed the normal (e.g., recent) error behavior. If the errors exceed the normal error behavior, then at operation 630 the visualization engine 215 generates visualization showing the abnormal error behavior. For example, the context engine 210 may store the last two weeks of errors (e.g., errors of a given type, 5xx class errors) and determine a moving average of errors over the two past weeks. The moving average may then be considered "normal" to the context engine 210. A threshold may be set as a multiplier of the normal behavior level. When the frequency of the errors surpasses the threshold, the errors exceed normal behavior, which the context engine 210 can detect at operation 625 after which the sub-routine terminates at operation 635. Alternatively, returning to operation 625, if the context engine 210 determines that the errors do not exceed normal behavior, the subroutine terminates at 635 without generating behavior visualizations or behavior alerts.

Figure 7A:
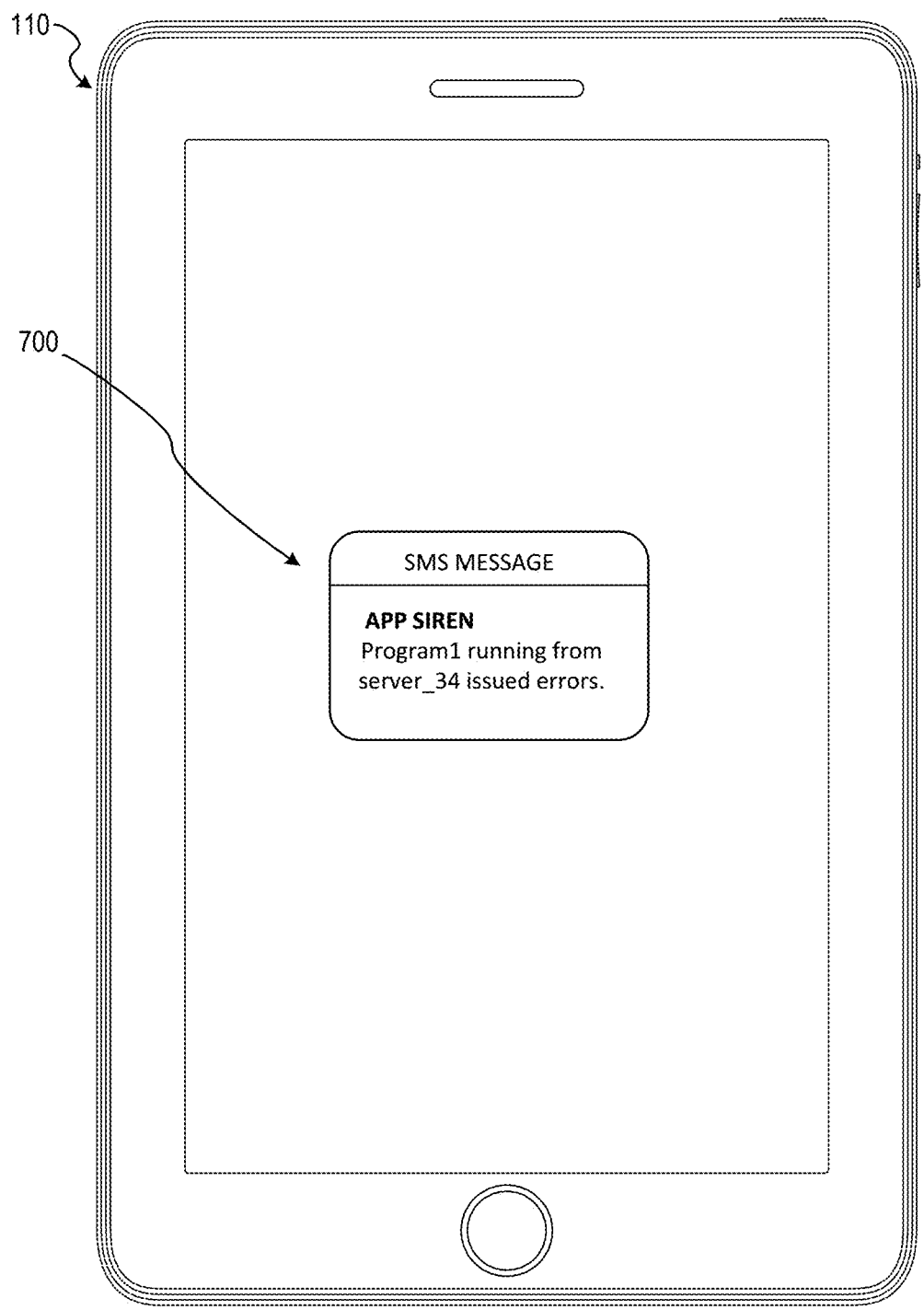
FIG. 7A shows an example of a client device displaying an example sparse message, according to some example embodiments.

FIG. 7A shows an example of a client device 110 displaying an example sparse message 700, according to some example embodiments. The sparse message 700 is an example of a message generated at operation 335 from a first type of template. The sparse message 700 (e.g., an SMS message) indicates that a single program, "Program1", running from specified server has issued one or more errors. In the example shown, numerous errors (e.g., 250 request errors) may have been issued by the program, however the errors have been batched into a single manageable notification as sparse message 700.

Figure 7B:
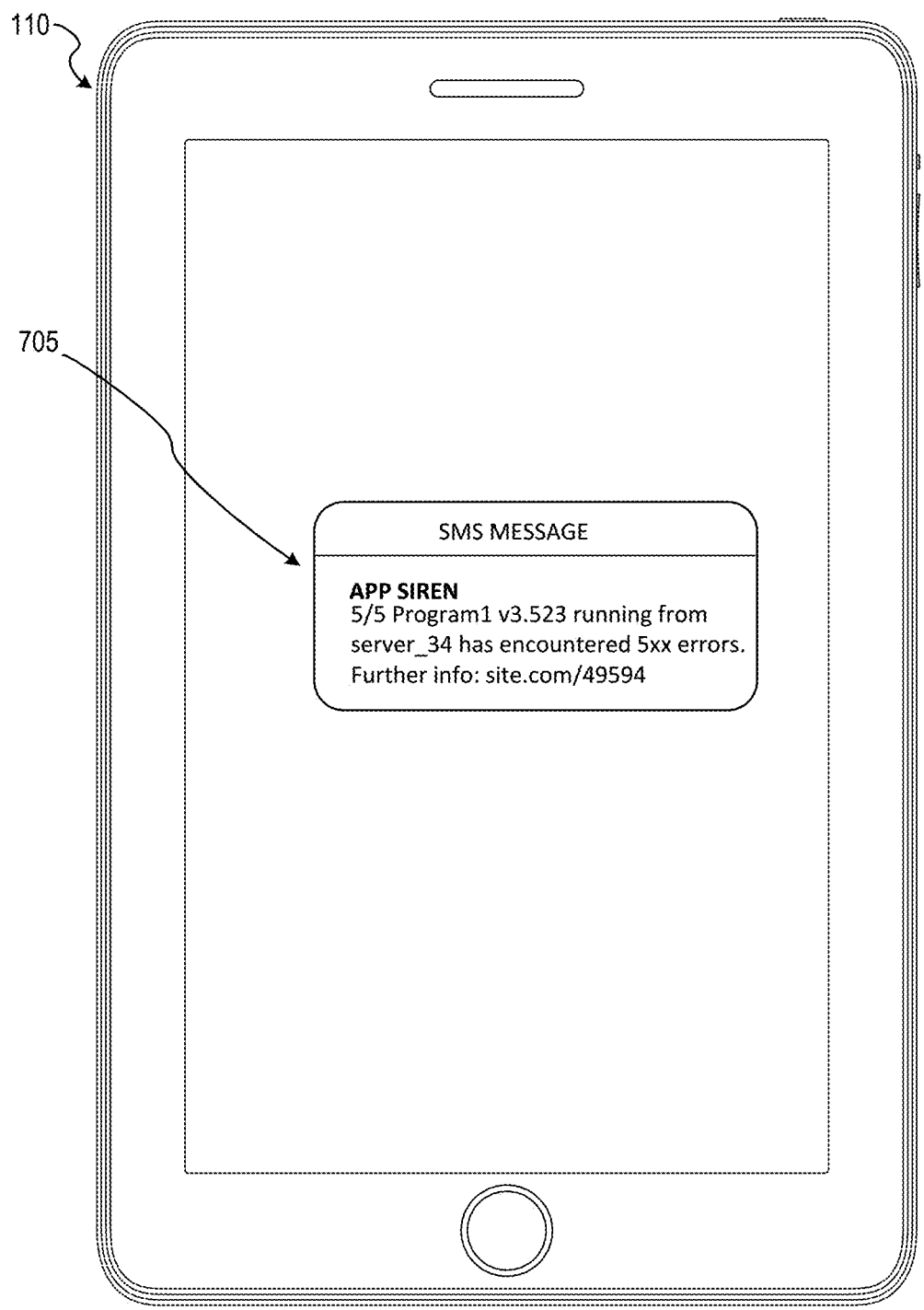
FIG. 7B shows an example of a client device displaying a sparse message, according to some example embodiments.

FIG. 7B shows an example of a client device 110 displaying a sparse message 705, according to some example embodiments. The sparse message 705 is an example of a message generated at operation 335 using a second template that includes more data. In particular, the sparse message 705 includes more information, such as a date "5/5" from the error log, the program name "Program1", and the type of errors "5xx" (HTTP 500 class errors). Further, the sparse message 705 contains a network link "site.com/49594" that links to an administrative console generated by console engine 225. The user 106 (not depicted) of client device 110 can use the link to access the administrative console.

FIGS. 8-12 show examples of user interfaces that can be included in a dashboard or administrative console. The particular user interfaces that are generated and included in the administrative console depend on which types of errors are found as discussed above, with reference to FIGS. 5 and 6. In some example embodiments, a single user interface takes up the entire display area of the console. Further, in some example embodiments, multiple user interfaces are shown in the console as different windows (e.g., as in a dashboard layout).

Figure 8:
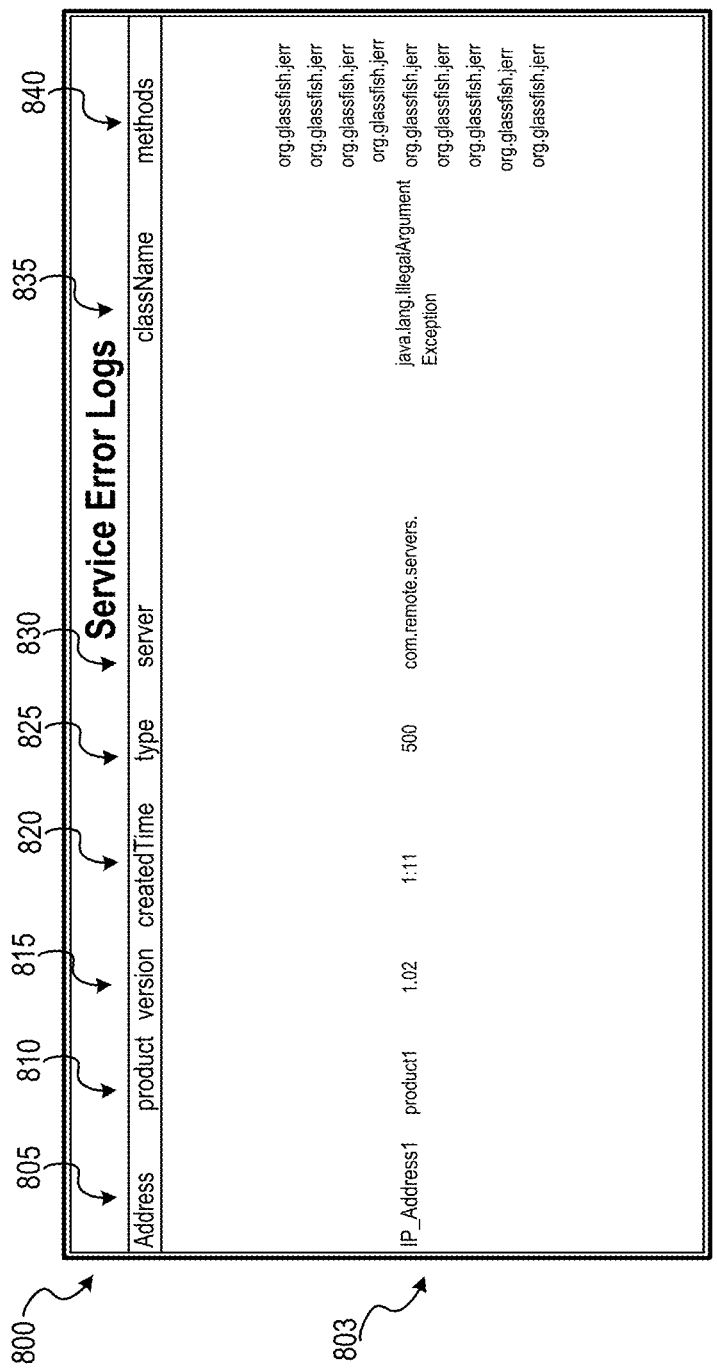

FIG. 8 shows an example user interface 800 that is included in an administrative console (e.g., dashboard), according to some example embodiments. The user interface 800 is an example of a visualization generated at operation 610 of method 600 (FIG. 6). The user interface 800 comprises a plurality of columns (e.g., schema), each containing a field for an error 803, where each error gets a new row. The data in the columns is verbose in that the data is ill suited for SMS protocol text messages (which have limit of 160 characters) or display within mobile devices that have limited screen sizes (e.g., a smart watch).

As illustrated in FIG. 8, an address column 805 describes address of the server (or other server identifier) in which the error occurred. A product column 810 describes the product (e.g., application 114) in which the error occurred. The version column 815 describes the version of the product in which the error occurred. The time column 820 specifies at what time the error occurred. The type column 825 describes the type of error (e.g., HTTP 500, as searched for and retrieved from the network status log using a search engine as discussed above). The server column 830 describes the servers in which the error occurred (e.g., "remote") and the monitoring program (e.g., "mapper"). The class name column 835 describes the type of execution or coding error (e.g., Illegal Argument, searched for and retrieved from the execution log using a search engine as discussed above). The methods column 840 describes the application 114's code that was executing on the server when the error occurred (e.g., a stack trace, from the execution log, as searched for and retrieved from the network status log using a search engine as discussed above).

Figure 9:
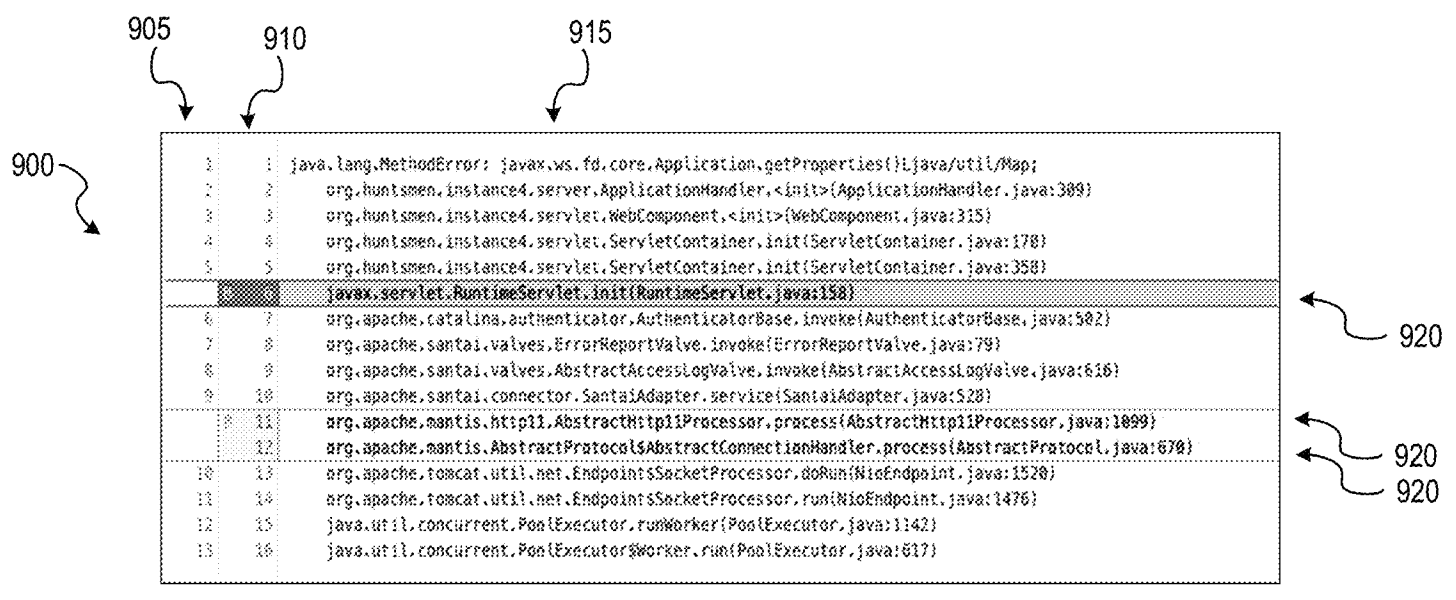

FIG. 9 shows an example user interface 900 that may be included in an administrative console (e.g., dashboard), according to some example embodiments. The user interface 900 is an example of a visualization generated at operation 610 of method 600 (FIG. 6), e.g., a visualization that compares verbose data (e.g., stack traces) of different errors.

In the illustrated example, two errors have occurred and their stack traces have been compared. In particular, column 905 comprises line entries for stack traces for the first error. Column 910 comprises line entries for the stack trace of the second error. Column 915 includes the individual entries of the stack trace. In the example illustrated, the stack traces differ in that the second stack trace includes the highlight rows 920, and the first stack trace does not contain these rows (as denoted by column 905 having gaps between rows 5 and 6, and 9 and 10). User interface 900 is an example embodiment of a visualization for comparing stack traces of different errors, however one of ordinary skill in the art will appreciate that other visualizations may be generated to indicate differences and similarities between stack traces of different errors.

Figure 10:
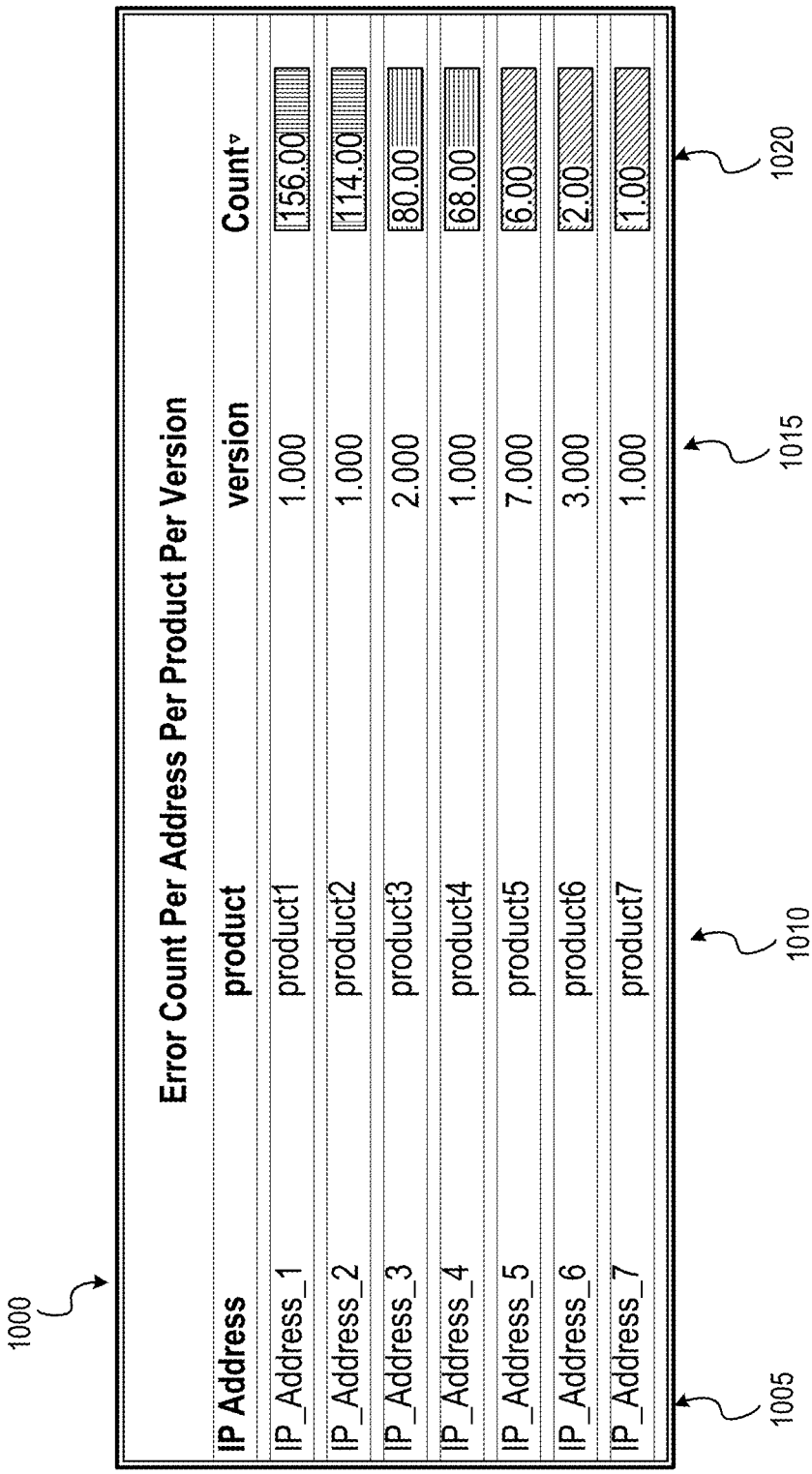

FIG. 10 shows an example user interface 1000 that may be included in an administrative console (e.g., dashboard), according to some example embodiments. The user interface 1000 is an example of a visualization generated at operation 620 of method 600 (FIG. 6), e.g., showing errors according in different instances. In particular, the user interface 1000 describes different errors occurring on different servers addressable by different IP addresses, per version, and per product using a plurality of columns and an entry (e.g., a row) for each entry. The address column 1005 describes where the errors occurred (e.g., physical or virtual servers at addressable by an IP address). The product column 1010 describes in which product the error occurred. The version row 1015 describes in which version of the product the error occurred. The count column 1020 describes how many errors occurred per server (instance of a server at an IP address) per version per product. As illustrated using color shading, each entry in the count column 1020 can be color coded to further communicate an amount of errors. For example, 100 or more errors are denoted in red, 20 or more error are denoted in blue, and less than 20 errors is denoted in green.

Figure 11:
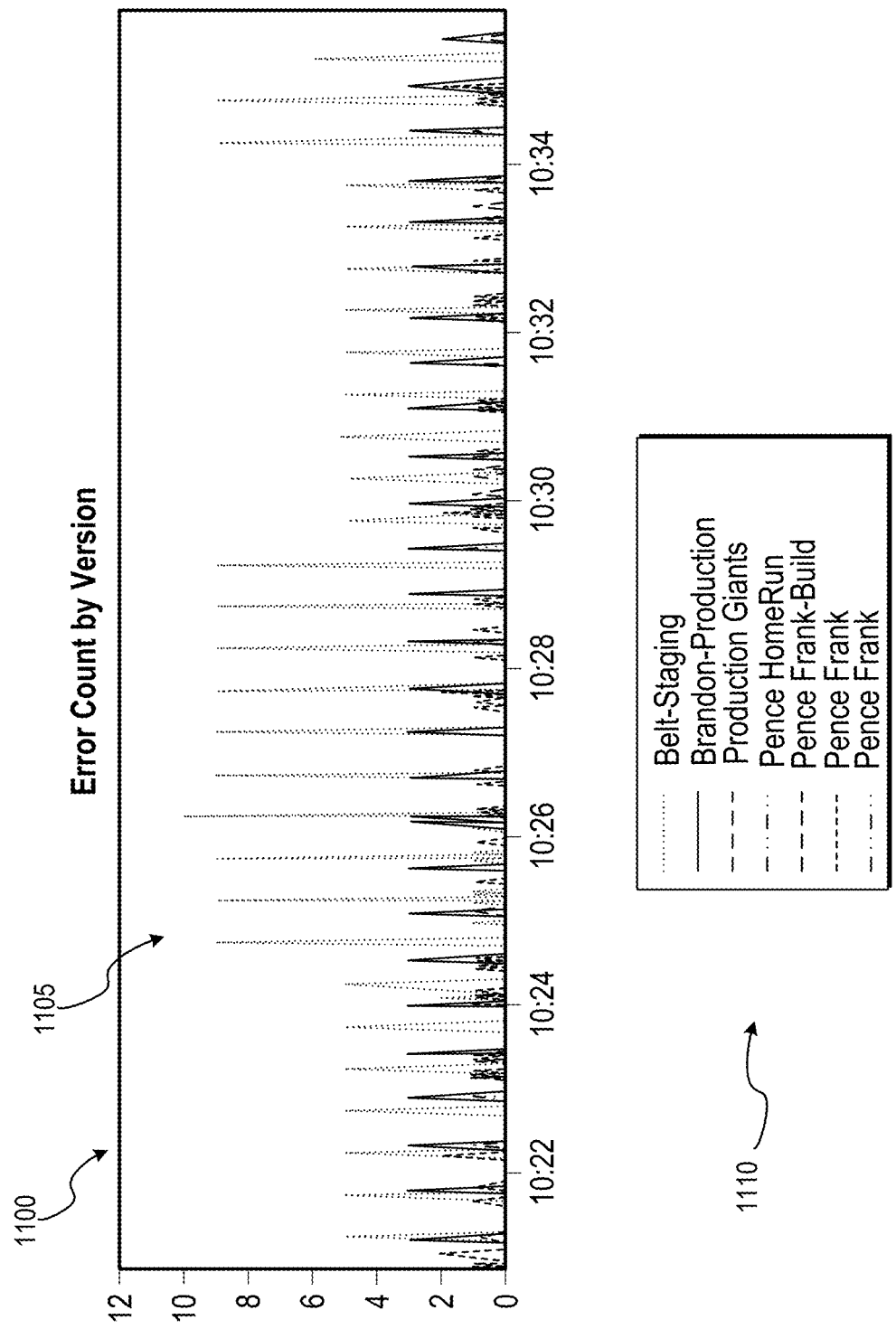

FIG. 11 shows an example user interfaces 1100 and 1110 that are included in an administrative console (e.g., dashboard), according to some example embodiments. The user interfaces 1100 and 1110 are examples of visualizations generated at operation 620 of method 600 (FIG. 6), e.g., a visualization depicting errors in different instances. In particular, the user interface 1100 is a graph showing error count by version, with the quantity of errors on the vertical axis (y-axis) and the time in which the errors occurred on the horizontal axis (x-axis). Lines 1105 are used to track each the error count per instance over time. User interface 1110 is a legend that indicates which version corresponds to which line using different patterns of dots and dashes. Although dots and dashes are used to differentiate different instances, in some examples other schemes are used, such as color coding each line differently, to differentiate between version errors in the graph. Further, although error count by version is used as an example in FIG. 11, the errors may be graphed using other parameters such as error count by instance, error count by server, and so on, as according to some example embodiments.

Figure 12:
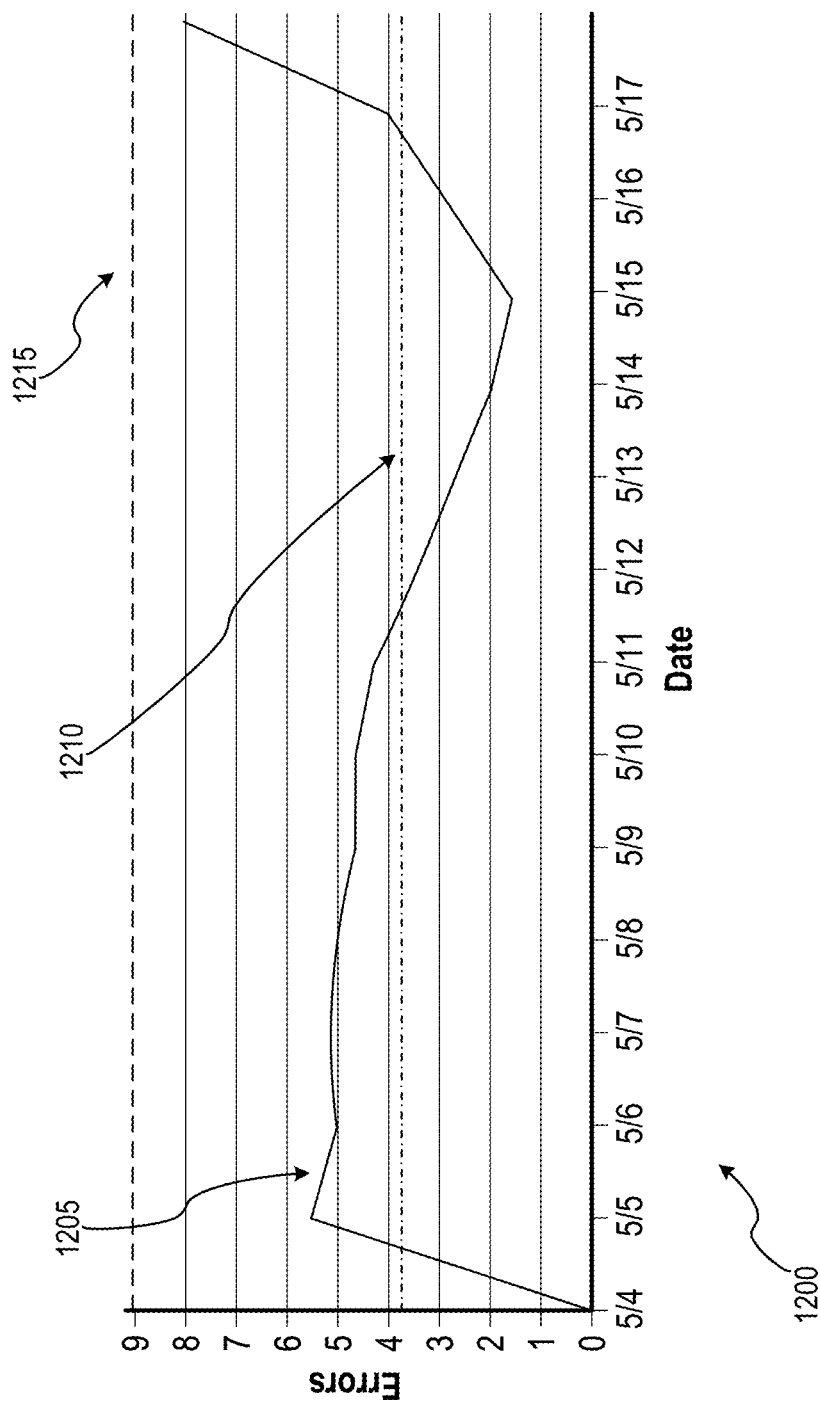

FIG. 12 shows an example user interface 1200 that is included in an administrative console (e.g., dashboard), according to some example embodiments. The user interface 1200 is an example of a visualization generated at operation 630 of method 600 (FIG. 6), e.g., a visualization that depicts errors occurring at an abnormal level. As discussed above, in some example embodiments, normal behavior is defined as the moving average for a past period of time. For example, the amount of errors in a given application 114 or instance for the past two weeks, two months, past year, etc., can be set as the normal error behavior for the given application 114. The time period length (e.g., two weeks, past 24 hours, past month) can be set in a preferences section of the administrative console (not depicted). As illustrated, the user interface 1200 is a graph showing error count by version, with the quantity of errors on the vertical axis (y-axis) and the time (in days) in which the errors occurred on the horizontal axis (x-axis). Solid line 1205 tracks the errors as they occur each day from May 4 to May 17 (e.g., the last two weeks). Dot-dash line 1210 shows the moving average over the past two weeks of errors. Dot-dash line 1210 may be representative of a level of normal error behavior for the past two weeks. In some example embodiments, a dash line 1215 represents a threshold that is set as a multiplier of the normal behavior. For example, as illustrated, the normal behavior is approximately 3.8 errors per day (as indicated by dot-dash line 1210), and the threshold is set approximately 2.4 times higher to 9.1 errors per day (as indicated by dash line 1215). Thus, if 10 errors occur in one day on the specified application 114, an error notification is generated for inclusion in the message sent to the developers and user interface 1200 is generated for inclusion in the dashboard, according to some example embodiments.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application 114 or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 104 (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications 114 and so forth described in conjunction with FIGS. 1-13 are implemented in some embodiments in the context of a machine and an associated software architecture. The sections below describe representative software architecture and machine (e.g., hardware) architecture that are suitable for use with the disclosed embodiments.

Figure 13:
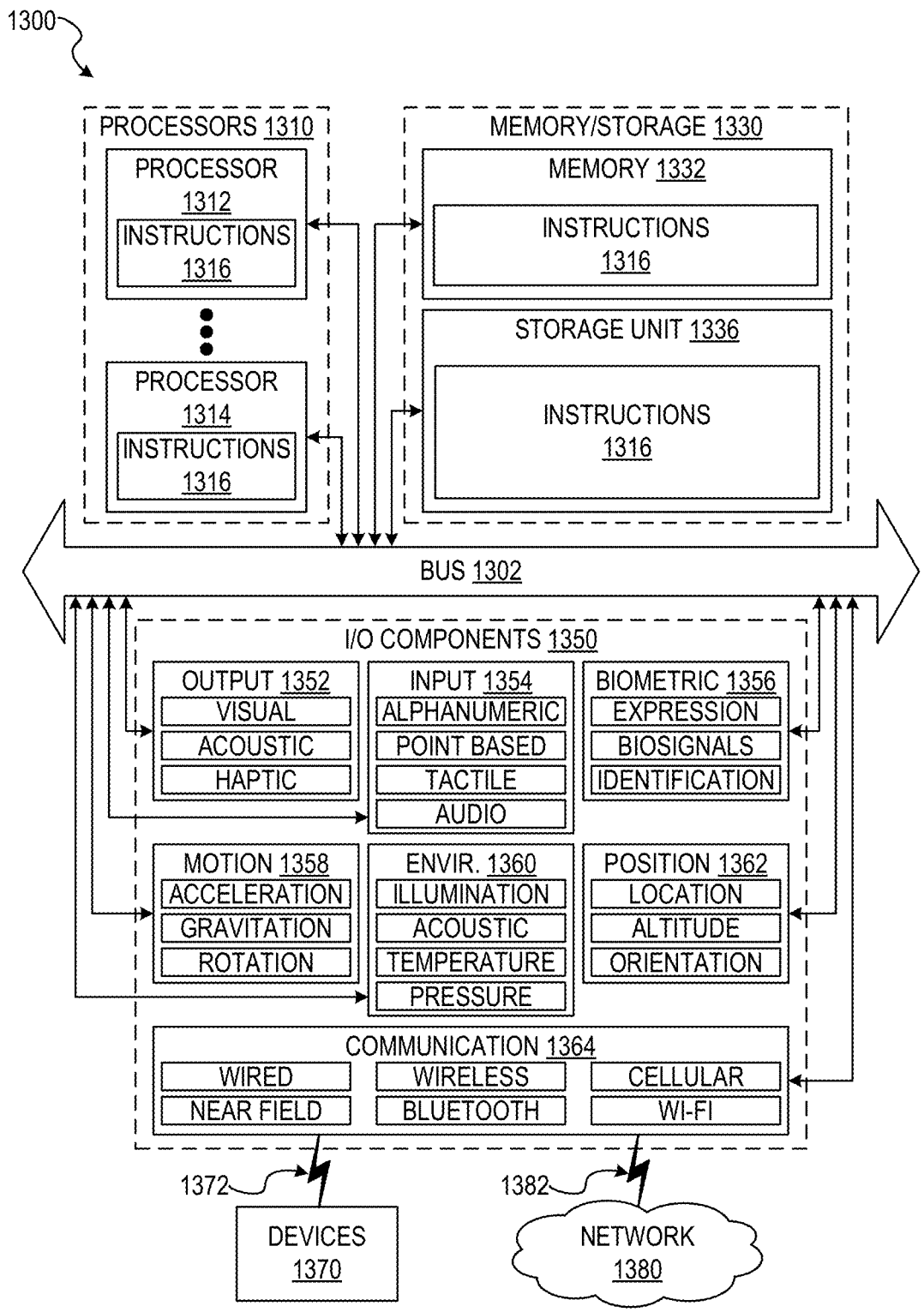
FIG. 13 illustrates a diagrammatic representation of a machine in the form of a computer system within which a set of instructions may be executed for causing the machine to perform any one or more of the methodologies discussed herein, according to an example embodiment.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application 113, an applet, an app, or other executable code) for causing the machine 1300 to perform any one or more of the methodologies discussed herein can be executed. For example, the instructions 1316 can cause the machine 1300 to execute the flow diagrams of FIGS. 3-6. Additionally, or alternatively, the instruction 1316 can implement the engines discussed with reference to FIG. 2, and so forth. The instructions 1316 transform the general, non-programmed machine 1300 into a particular machine programmed to carry out the described and illustrated functions in the manner described. In alternative embodiments, the machine 1300 operates as a standalone device or can be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1300 capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 can include processors 1310, memory/storage 1330, and I/O components 1350, which can be configured to communicate with each other such as via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) can include, for example, processor 1312 and processor 1314 that may execute instructions 1316. The term "processor" is intended to include multi-core processors 1310 that may comprise two or more independent processors 1312, 1314 (sometimes referred to as "cores") that can execute instructions 1316 contemporaneously. Although FIG. 13 shows multiple processors 1310, the machine 1300 may include a single processor 1312 with a single core, a single processor 1312 with multiple cores (e.g., a multi-core processor), multiple processors 1310 with a single core, multiple processors 1310 with multiples cores, or any combination thereof.

The memory/storage 1330 can include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 can also reside, completely or partially, within the memory 1332, within the storage unit 1336, within at least one of the processors 1310 (e.g., within the processor's cache memory), or any suitable combination thereof, during execution thereof by the machine 1300. Accordingly, the memory 1332, the storage unit 1336, and the memory of the processors 1310 are examples of machine-readable media.

As used herein, the term "machine-readable medium" means a device able to store instructions 1316 and data temporarily or permanently and may include, but is not be limited to, random-access memory (RAM), read-only memory (ROM), buffer memory, flash memory, optical media, magnetic media, cache memory, other types of storage (e.g., erasable programmable read-only Memory (EEPROM)) or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions (e.g., instructions 1316) for execution by a machine (e.g., machine 1300), such that the instructions 1316, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1350 can include a wide variety of components to receive input, provide output, produce output, transmit information, exchange information, capture measurements, and so on. The specific I/O components 1350 that are included in a particular machine 1300 will depend on the type of machine 1300. For example, portable machines such as mobile phones will likely include a touch input device or other such input mechanisms, while a headless server machine will likely not include such a touch input device. It will be appreciated that the I/O components 1350 can include many other components that are not shown in FIG. 13. The I/O components 1350 are grouped according to functionality merely for simplifying the following discussion, and the grouping is in no way limiting. In various example embodiments, the I/O components 1350 can include output components 1352 and input components 1354. The output components 1352 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1350 can include biometric components 1356, motion components 1358, environmental components 1360, or position components 1362 among a wide array of other components. For example, the biometric components 1356 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 can include acceleration sensor components (e.g., an accelerometer), gravitation sensor components, rotation sensor components (e.g., a gyroscope), and so forth. The environmental components 1360 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or other suitable device to interface with the network 1380. In further examples, communication components 1364 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1370 may be another machine or any of a wide variety of peripheral devices (e.g., a peripheral device coupled via a Universal Serial Bus (USB)).

Moreover, the communication components 1364 can detect identifiers or include components operable to detect identifiers. For example, the communication components 1364 can include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or other type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1316 can be transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, the instructions 1316 can be transmitted or received using a transmission medium via the coupling 1372 (e.g., a peer-to-peer coupling) to devices 1370. The term "transmission medium" shall be taken to include any intangible medium that is capable of storing, encoding, or carrying the instructions 1316 for execution by the machine 1300, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving a stack trace log including a first set of programming code being executed when a first error was encountered in relation to execution of a first network application;
   extracting a first portion of the first set of programming code that includes at least an application name of the first network application and an error type of the first error;
   generating a notification message including the first portion of the first set of programming code and a link to an administrative user interface displaying the first set of programming code, including a non-extracted portion of the first set of programming code that is not included in the first portion; and
   transmitting the notification to at least one electronic message address associated with the first network application.

2. The method of claim 1, further comprising:
   searching the stack trace log for pre-specified error data using a search engine, the search engine configured to search for the errors using pre-specified error terms.

3. The method of claim 1, wherein the stack trace log includes a network request log and an execution log, the network request log comprising network request data describing network requests performed by the one or more network servers, the execution log comprising programming code executed by the one or more network servers during execution of the first network application.

4. The method of claim 3, wherein the first portion includes data from the network request log and the non-extracted portion includes data from the execution log.

5. The method of claim 1, further comprising:
   determining, based on the stack trace log, a number of errors of a second error type encountered in relation to execution of the first network application;
   comparing the number of errors of the second error type to a pre-specified threshold number; and
   responsive to determining that the number of errors of the second error type do not surpass the pre-specified threshold number, determining that a notification related to the errors of the second error type should not be sent to the one or more users corresponding to the first network application.

6. The method of claim 1, further comprising:
   generating a visualization that indicates that errors of the first error type were encountered in relation to execution of the first network application and at least a second network application; and
   including the visualization in the administrative user interface.

7. The method of claim 1, further comprising:
  determining that a number of errors of the first error type that were encountered in relation to execution of the first network application exceeds a threshold number, the threshold number being based on statistical normal error activity;
  responsive to determining that the number of errors of the first error type exceeds the threshold number, generating a visualization that indicates a quantity of the errors of the first error type which surpasses the statistical normal error activity; and
  including the visualization in the administrative user interface.

8. The method of claim 1, wherein the at least one electronic message address is a short message service (SMS) address, and a number of characters included in the first portion of the first set of programming code is no greater than a maximum number of characters specified in an SMS protocol.

9. The method of claim 8, wherein the non-extracted portion includes stack trace data from programming methods called when the first error was encountered.

10. A system comprising:
  one or more computer processors; and
  one or more computer-readable mediums storing instructions that, when executed by the one or more computer processors, cause the system to perform operations comprising:
    receiving a stack trace log including a first set of programming code being executed when a first error was encountered in relation to execution of a first network application;
    extracting a first portion of the first set of programming code that includes at least an application name of the first network application and an error type of the first error;
    generating a notification message including the first portion of the first set of programming code and a link to an administrative user interface displaying the first set of programming code, including a non-extracted portion of the first set of programming code that is not included in the first portion; and
    transmitting the notification to at least one electronic message address associated with the first network application.

11. The system of claim 10, the operations further comprising:
  searching the stack trace log for pre-specified error data using a search engine, the search engine configured to search for the errors using pre-specified error terms.

12. The system of claim 10, wherein the stack trace log includes a network request log and an execution log, the network request log comprising network request data describing network requests performed by the one or more network servers, the execution log comprising programming code executed by the one or more network servers during execution of the first network application.

13. The system of claim 12, wherein the first portion includes data from the network request log and the non-extracted portion includes data from the execution log.

14. The system of claim 10, the operations further comprising:
  determining, based on the stack trace log, a number of errors of a second error type encountered in relation to execution of the first network application;
  comparing the number of errors of the second error type to a pre-specified threshold number; and
  responsive to determining that the number of errors of the second error type do not surpass the pre-specified threshold number, determining that a notification related to the errors of the second error type should not be sent to the one or more users corresponding to the first network application.

15. The system of claim 10, the operations further comprising:
  generating a visualization that indicates that errors of the first error type were encountered in relation to execution of the first network application and at least a second network application; and
  including the visualization in the administrative user interface.

16. The system of claim 10, the operations further comprising:
  determining that a number of errors of the first error type that were encountered in relation to execution of the first network application exceeds a threshold number, the threshold number being based on statistical normal error activity;
  responsive to determining that the number of errors of the first error type exceeds the threshold number, generating a visualization that indicates a quantity of the errors of the first error type which surpasses the statistical normal error activity; and
  including the visualization in the administrative user interface.

17. The system of claim 10, wherein the at least one electronic message address is a short message service (SMS) address, and a number of characters included in the first portion of the first set of programming code is no greater than a maximum number of characters specified in an SMS protocol.

18. The system of claim 17, wherein the non-extracted portion includes stack trace data from programming methods called when the first error was encountered.

19. A non-transitory computer-readable medium storing instructions that, when executed by one or more computer processors of one or more computing devices, cause the one or more computing devices to perform operations comprising:
  receiving a stack trace log including a first set of programming code being executed when a first error was encountered in relation to execution of a first network application;
  extracting a first portion of the first set of programming code that includes at least an application name of the first network application and an error type of the first error;
  generating a notification message including the first portion of the first set of programming code and a link to an administrative user interface displaying the first set of programming code, including a non-extracted portion of the first set of programming code that is not included in the first portion; and
  transmitting the notification to at least one electronic message address associated with the first network application.

20. The non-transitory computer-readable medium of claim 19, the operations further comprising:
  searching the stack trace log for pre-specified error data using a search engine, the search engine configured to search for the errors using pre-specified error terms.

* * * * *